J. GALLIMORE.
VARIABLE SPEED CHANGE GEAR INDICATOR.
APPLICATION FILED NOV. 25, 1919.

Patented May 31, 1921.

Inventor
John Gallimore
By B. Singer, Atty

J. GALLIMORE.
VARIABLE SPEED CHANGE GEAR INDICATOR.
APPLICATION FILED NOV. 25, 1919.

1,379,757.

Patented May 31, 1921.

UNITED STATES PATENT OFFICE.

JOHN GALLIMORE, OF EDINBURGH, SCOTLAND.

VARIABLE-SPEED CHANGE-GEAR INDICATOR.

1,379,757.  Specification of Letters Patent.  Patented May 31, 1921.

Application filed November 25, 1919. Serial No. 340,645.

*To all whom it may concern:*

Be it known that I, JOHN GALLIMORE, subject of the King of Great Britain, and resident of Edinburgh, Scotland, have invented certain new and useful Improvements in and Relating to Variable-Speed Change-Gear Indicators, of which the following is a specification.

This invention relates to variable speed change gears and it has for its object the provision of improvements in and relating to means whereby the transmitted speed of any setting thereof is automatically indicated or recorded. A further object of the invention is to provide means, also automatically operated, whereby only one recording scale is visible for each combination thereby obviating confusion and facilitating expeditious adjustment to meet varying requirements of speed.

The present invention comprises a system of toothed change speed gear combined with a system of belt pulley change speed gear and provided with means whereby the change of speed in each system can be separately and simultaneously indicated or recorded on one indicator or recorder.

The invention more particularly provides in such combined systems, means whereby one of a number of speed indicating or recording scales corresponding to the number of speeds in the toothed gear is adapted to be moved into an indicating or registering position, such movement being effected by means of the toothed speed gear changing mechanism, and at the same time also provides means whereby a pointer can be moved over the said scale, such movement being effected by means of the mechanism for effecting the change of speed in the belt gear in such a manner that the said pointer will be moved to a position corresponding to such change of speed.

As a practical application of the invention we will describe the same in connection with a variable speed change gear consisting of a plurality of toothed gears arranged in stepped changes in conjunction with a friction or belt driven change speed combination. This latter combination permits of intermediate speeds between the predetermined speeds of any pair of said geared stepped changes.

The accompanying drawings illustrate two forms of the invention applied to a system of toothed change speed gear of the sliding gear type, combined with a belt change speed gear of the kind in which a pair of V-shaped pulleys of variable effective diameter are used.

Figure 1:
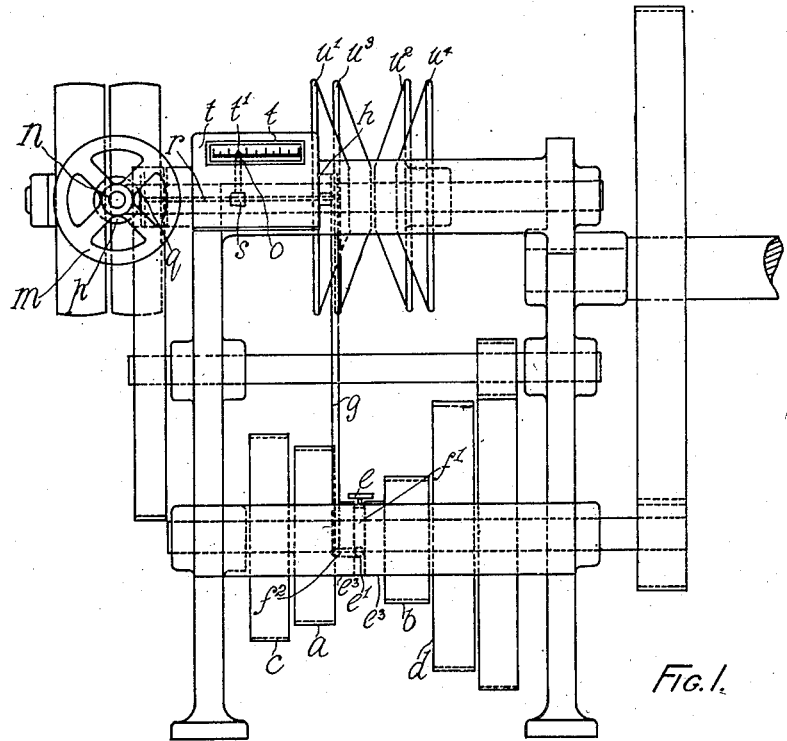
Figure 2:
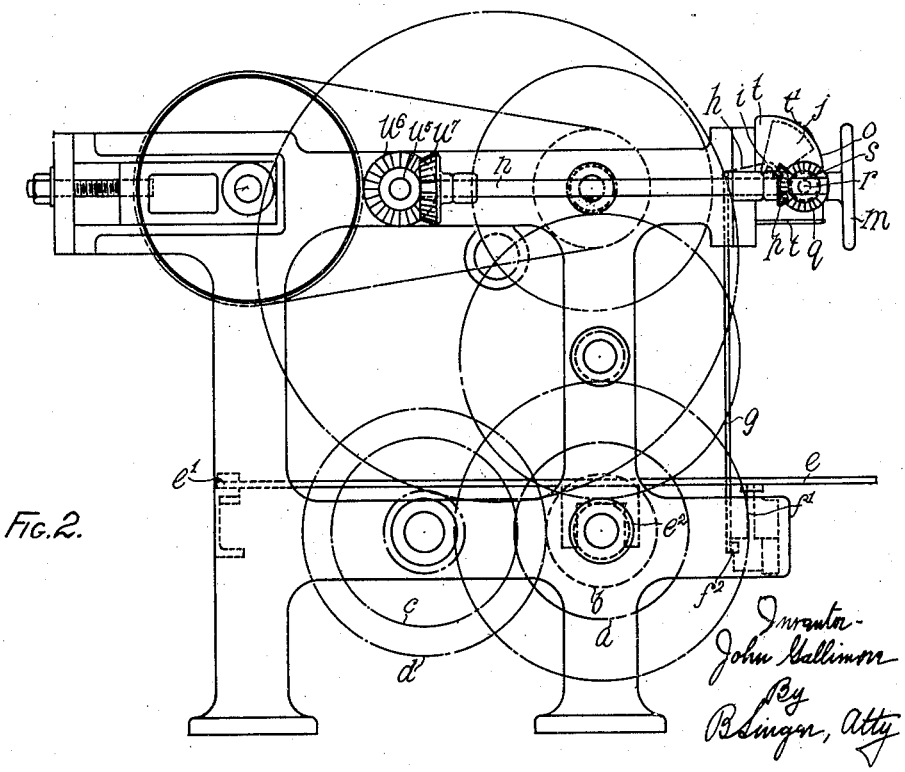
Figure 3:
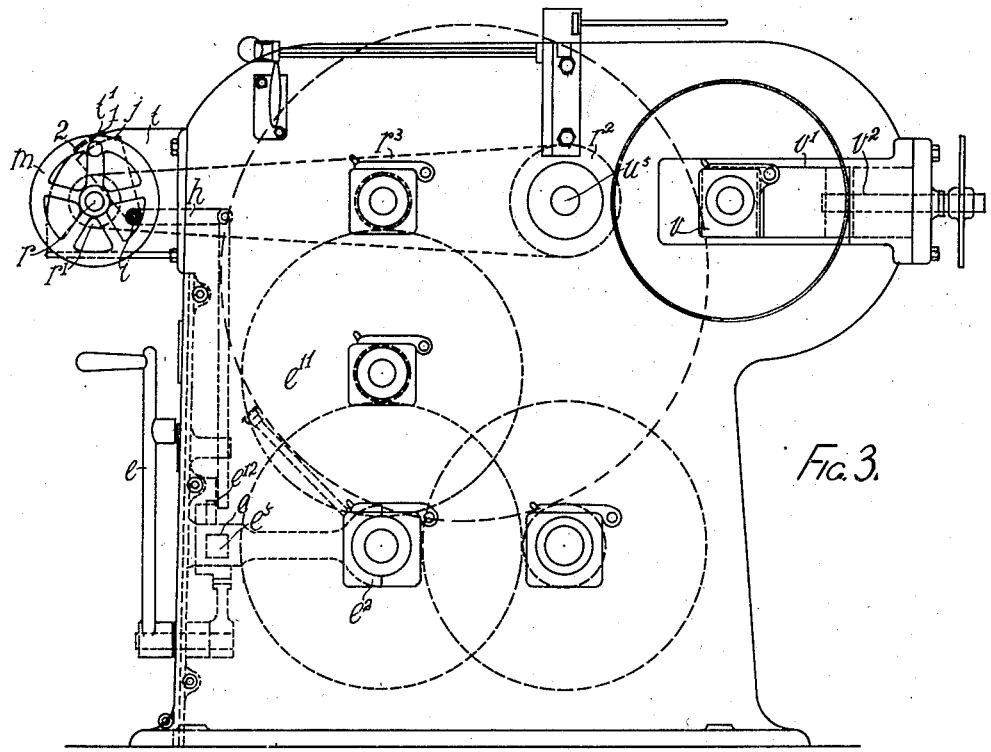
Figure 4:
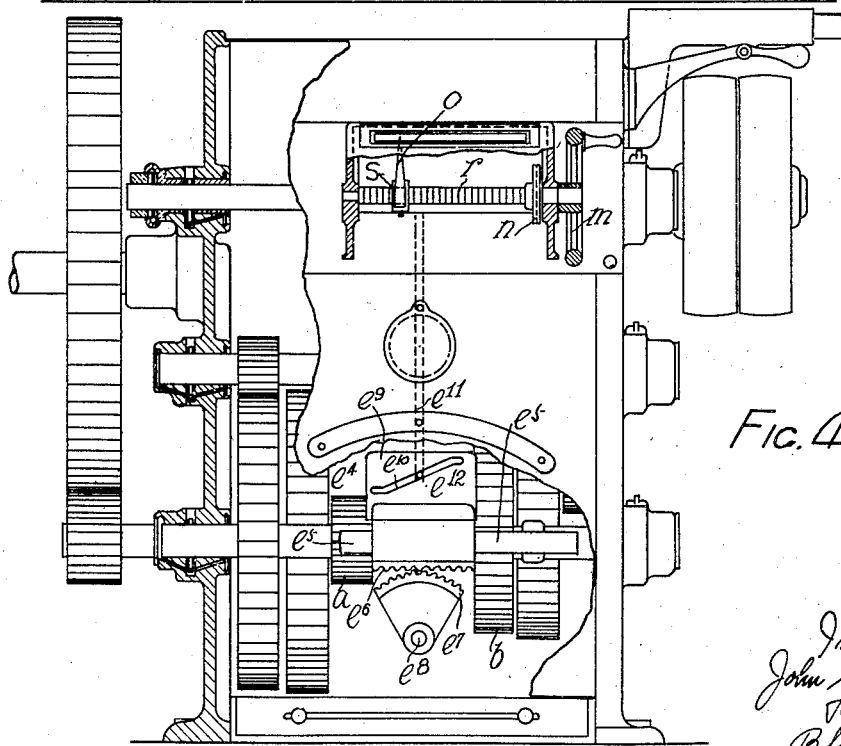

In the first of these forms of the invention Figure 1 is a front elevation and Fig. 2 is a side elevation, and in the second form Figs. 3 and 4 are respectively side and front elevations.

In Figs. 1 and 2, $a$ and $b$ are the sliding gear wheels of a two speed variable speed gear, $c$ and $d$ being the corresponding fixed gear wheels. $a$ and $b$ are fixed together so that they can be moved axially on their shaft to bring, when moved in one direction, $a$ and $c$ into gear for one speed, and when moved in the other direction, to bring $b$ and $d$ into gear for the other speed. A suitable hand lever $e$ for operating these changes of speed is pivoted to the framing of the gear at $e^1$, and provided with a forked member $e^2$ adapted to engage a groove formed in the boss $e^3$ connecting the gear wheels $a$ and $b$.

The hand lever $e$ is also arranged to operate the arm $f^1$ of a bell-crank lever of which the other arm $f^2$ is movably jointed to the lower end of a connecting rod $g$. The upper end of this connecting rod is jointed in a similar manner to the end of a lever or crank $h$ adapted to rock a shaft $i$ on which is fixed a quadrant $j$. This quadrant has two scales 1 and 2 fixed or formed on its periphery, these scales indicate according to which of them is brought under a viewing opening $t^1$ formed in a casing $t$ which of the two speeds of the toothed speed gear is in operation.

The belt pulley variable speed gear consists of two pulleys having V-shaped peripheries adapted to receive an endless belt. These pulleys are formed of conical members $u^1$, $u^2$, $u^3$ and $u^4$, adapted to be moved relatively so as to increase the effective diameter of one pulley while that of the other is being correspondingly reduced according to the desired change of speed, by means of a shaft $u^5$, bevel gears $u^6$ and $u^7$, shaft $n$ and hand operating wheel $m$ secured thereon. The shaft $n$ has also mounted thereon a bevel gear $p$ adapted to gear with a bevel gear $q$ mounted on a shaft $r$. This shaft is screw-threaded for the greater portion of its length and is adapted to give an axial movement to a nut $s$ fitted thereon and provided with a pointer $o$ arranged to move over the scale brought into indicating or registering position. It will be thus seen that when the hand wheel m is operated to make a change in the speed to the belt gear, the pointer s is simultaneously moved along the scale previously brought into indicating or recording position by the hand lever e and so indicate thereon such change in speed according to which of the toothed speed gears has been brought into operation.

In the form of the invention shown in Figs. 3 and 4 the two speed toothed gear and the quadrant scale carrier are similar to those shown in Figs. 1 and 2. The mechanism for communicating motion between the sliding gears and the quadrant are, however, somewhat different. The fork $e^2$ for sliding the gears a and b is extended to form a boss $e^4$ secured to a slide bar $e^5$ adapted to slide in bearings arranged parallel to the sliding gear shafting on the main gear supporting frames. This boss $e^4$ is provided on its under side with a rack adapted to gear with and be moved by a toothed quadrant $e^7$ mounted on a shaft $e^8$ to which is also secured an operating hand lever e. The boss $e^4$ has secured to its upper side a cam plate $e^9$ having cam slot $e^{10}$ cut therein of such a shape that it will when moved horizontally by the aforesaid lever e transmit a vertical motion to a rod $e^{11}$ provided at its lower end with a roller or pin $e^{12}$ adapted to bear on the edge of the said slot $e^{10}$. The upper end of the rod $e^{11}$ is movably jointed to the end of a lever or crank h secured to a shaft i on which is fixed a quadrant j carrying the scales 1 and 2 as in Fig. 2, a similar casing t having a viewing opening $t^1$ being also provided.

The mechanism for moving the pointer o in this example, comprises a nut s on which the said pointer is secured, the said nut being screwed to fit a shaft r mounted in suitable bearings in the gear framing and provided with an operating hand wheel r. On the shaft r is also mounted a chain or sprocket wheel $r^1$ which is placed in positive gear with a similar chain or sprocket wheel $r^2$ by means of a chain $r^3$. The wheel $r^2$ is secured to a shaft $u^5$ adapted to effect the changes in the effective diameter of a pair of V-shaped belt pulley variable speed gear as in the previous example shown in Figs. 1 and 2, the method of operation being also the same as described with reference to the previous example.

The endless V-belt of the belt speed gear may be tightened or adjusted by any suitable known means as by mounting the shaft of one pair of pulleys in sliding bearing v arranged at each end of the shaft and adapted to be moved simultaneously in guide ways $v^1$ by means of screws $v^2$, and sprocket or chain wheels $v^3$ operatively geared together by means of an endless chain.

In the above examples only two speeds are shown in the toothed variable speed gear, and it will be readily understood that the invention can be applied to cases where more than two toothed speed gears are desirable, by increasing the number of scales in the quadrant correspondingly and also the throw or range of motion of the operating gear.

What I claim and desire to secure by Letters Patent is:—

1. Variable speed change gear comprising a toothed change speed gear and a belt pulley change speed gear, speed indicating scales corresponding in number to the speed changes of the toothed gear and adapted to be brought singly into an indicating position, a pointer coöperating with said visible scale, and means whereby said scales are moved to indicate the change in speed of said toothed change speed gear and the pointer to indicate the change in speed of the belt pulley change speed gear separately and simultaneously on one indicating scale consequent upon the operation of each of said gears.

2. Variable speed change gear comprising a toothed change speed gear and a belt pulley change speed gear, an indicator for denoting the change in the speed of each of said gears separately and simultaneously comprising speed indicating scales corresponding in number to the changes in the toothed change speed gear, means whereby only one scale is visible at a time, means for operating the toothed change speed gear, means connecting said toothed change speed gear to the indicating scales so as to bring one of said scales into an indicating position at each change in speed of said toothed gear, means for operating the belt pulley change speed gear, a pointer adapted to be moved over the visible scale, and means connecting the belt pulley gear operating mean to the pointer whereby said pointer is moved a predetermined distance across the indicating scale at each change of speed in said belt gear.

3. Variable speed change gear comprising a toothed change speed gear and a belt pulley change speed gear, an indicator for denoting the change in the speed of each of the said gears separately and simultaneously, comprising a pivoted quadrant the face of which is provided with indicating scales corresponding in number to the changes in the toothed change speed gear, a casing coöperating with said quadrant having an opening therein adapted to expose said scales singly, means connecting said toothed change speed gear to the indicating scales so as to bring one of said scales opposite the opening in the casing at each change in speed of said toothed gear, means for operating the belt pulley change speed gear, a pointer adapted to be moved over the visible scale, and means connecting the belt pulley gear operating means to the pointer whereby said pointer is moved a predetermined distance across the indicating scale at each change of speed in said belt gear.

4. Variable speed change gear comprising a toothed change speed gear and a belt pulley change speed gear, an indicator for denoting the change in the speed of each of the said gears separately and simultaneously comprising a pivoted quadrant the face of which is provided with indicating scales corresponding in number to the changes in the toothed change speed gear, a casing coöperating with said quadrant having an opening therein adapted to expose said scales singly, means for operating said toothed change speed gear, a pivoted lever coöperating with said means, a link connecting said pivoted lever to the quadrant whereby said quadrant is rocked consequent upon the operation of the toothed change speed gear, operating means so as to bring one of said scales into an indicating position at each change in speed of said toothed gear, means for operating the belt pulley change speed gear, a pointer adapted to be moved over the visible scale, and means connecting the belt pulley gear operating means to the pointer whereby said pointer is moved a predetermined distance across the indicating scale at each change of speed in said belt gear.

5. Variable speed change gear comprising a toothed change speed gear and a belt pulley change speed gear, an indicator for denoting the change in the speed of each of the said gears separately and simultaneously comprising a pivoted quadrant the face of which is provided with indicating scales corresponding in number to the changes in the toothed change speed gear, a casing coöperating with said quadrant having an opening therein adapted to expose said scales singly, means for operating said toothed change speed gear, a pivoted lever coöperating with said means, a link connecting said pivoted lever to the quadrant whereby said quadrant is rocked consequent upon the operation of the toothed change speed gear operating means so as to bring one of said scales into an indicating position at each change in speed of said toothed gear, means for operating the belt pulley change speed gear, a pointer mounted upon a nut adapted to be moved along a screw threaded shaft, means for operating the belt pulley change speed gear, means connecting said screw threaded shaft to said belt pulley change speed gear operating means whereby when a change in speed is made in said belt pulley change speed gear the pointer is simultaneously moved into such a position as to indicate such change in speed.

In witness whereof I affix my signature.

JOHN GALLIMORE.